J. M. ROSS.
Corn Sheller.

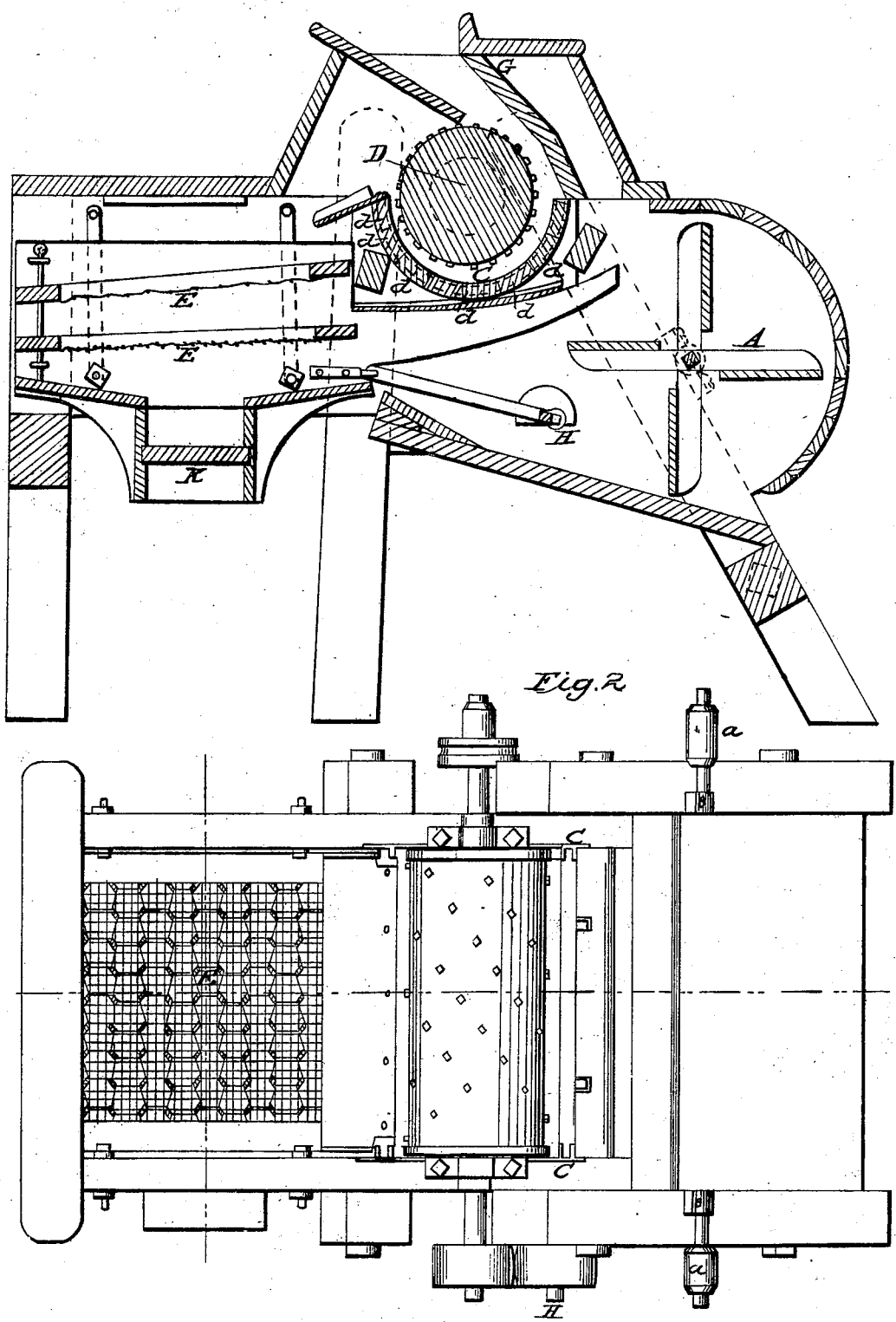

Patented June 29, 1869.

Witnesses
James P. Graves
L. L. Kant

Inventor
J. M. Ross
Chipman, Hosmer & Co.
attys

United States Patent Office.

JAMES M. ROSS, OF LINDEN HALL, PENNSYLVANIA.

Letters Patent No. 92,103, dated June 29, 1869.

IMPROVEMENT IN CORN-SHELLERS.

The Schedule referred to in these Letters Patent and making part of the same.

*To all whom it may concern:*

Be it known that I, JAMES M. ROSS, of Linden Hall, in the county of Centre, and State of Pennsylvania, have invented a new and valuable Improvement in Corn-Shellers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal section of my invention.

Figure 2 is a plan view, with the hopper removed.

Figure 3:
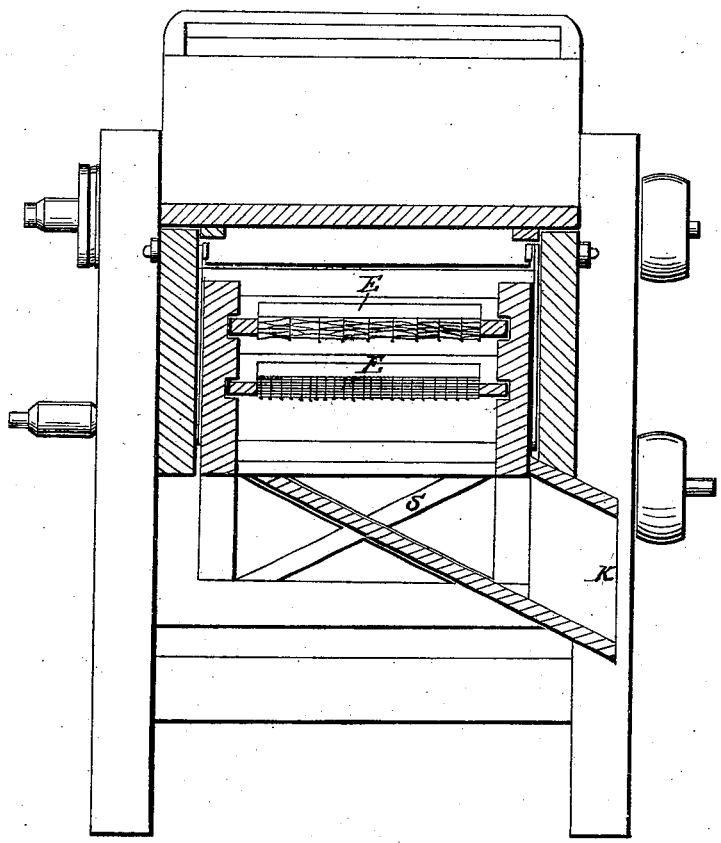
Figure 3 is a sectional view of the sieve and conduit part of the machine.

My invention relates to means for shelling corn; and

It consists mainly in the construction and novel arrangement of devices, by which corn in large quantities may be effectually and expeditiously shelled.

To this end, I construct a frame, as shown on the drawings, resembling in shape and proportions an ordinary fanning-mill, but extended to a length greater than is usual in such mills proportionately.

The letter A of the drawings represents a revolving fan, arranged in the frame above mentioned, and operating like the fan of a fanning-mill. Its shaft has its bearings upon the main frame, as shown, and has also a belt-drum at each end, outside the bearings, as represented by the letters *a*.

The letter B represents a concave box, open at its top, and adapted to the shape of the cylinder D, mentioned hereafter.

This box B is constructed of a series of bars, arranged at their ends in flanches, affixed inside the frame, as represented at *c*, and between each two of said bars is affixed a knife, or cutter, marked *d*.

These knives should protrude slightly above the surface of the bars.

The letter D represents a cylinder, having upon its surface a series of spikes, arranged in diagonal lines. It has drums for belts outside its bearings, as shown, and for the purpose hereinafter mentioned.

The letter E represents a series of three or more sieves, arranged to vibrate longitudinally with the frame, by the means next described.

The letter H is a shaft, with a drum for belt outside its bearings, and having cranks inside thereof, to which rods are attached, leading therefrom to the sieves E.

The movements of these cranks operate the sieves back and forth, as stated above.

The letter K represents a removable conduit, arranged below the sieves, in the manner shown on fig. 3 of the drawings.

My method of attaching said conduit to the sieve-frame is as follows:

I extend the sides of the frame that holds the sieves downward, below the sieves about fifteen inches, more or less, and cut out the centres thereof, so as to leave two points on each side, between which the conduit is to be placed.

Between these points, respectively, and crosswise of the line of the sieves, I affix slats, which serve as side-bars for the conduit.

In these slats, I cut grooves, as shown on the drawings, to hold the conduit, and provide means for its removal.

These grooves are marked *s* on the drawings, and are cut in such form that they cross each other on diagonal lines.

My conduit proper is simply a board, or plate, adapted to the grooves *s*, and having a quadrangular open mouth, as the drawings represent.

It is attached to the sieve-frame by sliding its plate into the grooves *s*, on either side of the machine the operator may desire.

The letter G represents a removable hopper, arranged over the cylinder D, into which the corn is placed before shelling, and through which it passes to the cylinder.

My machine is operated by belts upon the drums above mentioned.

The corn is passed into the hopper G. It is shelled by the cylinder D, in conjunction with the knives, or cutters *d*.

It then passes to the sieves and is fanned, and from thence is carried, through the conduit K, to any receptacle that may be prepared therefor.

What I claim as my invention, and desire to secure by Letters Patent, is—

A corn-sheller, having cylinder D, knives *d*, fan A, shaft H, and conduit K, constructed and arranged to operate substantially as specified.

In testimony that I claim the above, I have hereunto subscribed my name, in the presence of two witnesses.

JAMES M. ROSS.

Witnesses:
 JAMES P. GREVES,
 DENNIS D. KANE.